(12) United States Patent
Lalancette et al.

(10) Patent No.: US 11,408,051 B2
(45) Date of Patent: Aug. 9, 2022

(54) METHOD AND SYSTEM FOR METAL RECOVERY FROM ARSENICAL BEARING SULFIDES ORES

(71) Applicant: DUNDEE SUSTAINABLE TECHNOLOGIES INC., Montreal (CA)

(72) Inventors: Jean-Marc Lalancette, Sherbrooke (CA); David Lemieux, Thetford Mines (CA); Romain Barbaroux, St-Joseph De Coleraine (CA); Gabriel Garcia-Curiel, Hampstead (CA); Khalil Nasrallah, Thetford Mines (CA)

(73) Assignee: DUNDEE SUSTAINABLE TECHNOLOGIES INC.

( * ) Notice: Subject to any disclaimer, the term of this patent is extended or adjusted under 35 U.S.C. 154(b) by 561 days.

(21) Appl. No.: 15/876,563

(22) Filed: Jan. 22, 2018

(65) Prior Publication Data

US 2018/0282839 A1   Oct. 4, 2018

Related U.S. Application Data

(60) Provisional application No. 62/478,836, filed on Mar. 30, 2017.

(51) Int. Cl.
*C22B 1/02* (2006.01)
*C01G 28/00* (2006.01)

(52) U.S. Cl.
CPC .............. *C22B 1/02* (2013.01); *C01G 28/005* (2013.01)

(58) Field of Classification Search
CPC ......... C22B 1/02; C22B 30/04; C01G 28/005; C01G 28/00
See application file for complete search history.

(56) References Cited

U.S. PATENT DOCUMENTS

| 2,847,281 A | * | 8/1958 | Ortuno ........................ B01J 8/28 |
| | | | 423/542 |
| 2,977,215 A | * | 3/1961 | Meyer .................... C22B 1/2406 |
| | | | 75/752 |
| 4,164,416 A | * | 8/1979 | Gehri ....................... C22B 13/02 |
| | | | 423/DIG. 12 |

(Continued)

FOREIGN PATENT DOCUMENTS

| GB | 888297 A | * | 1/1962 | |
| GB | 888297 A | * | 1/1962 | ............... C22B 1/02 |
| WO | 9806878 | | 2/1998 | |

OTHER PUBLICATIONS

"Arsenious Oxide (As4O6)." Arsenious Oxide (As4O6), National Institute of Standards and Technology, webbook.nist.gov/cgi/inchiID=R423013&Units=SI. (Year: 2018).*

(Continued)

*Primary Examiner* — Jenny R Wu
(74) *Attorney, Agent, or Firm* — Lavery, De Billy, LLP; Gwendoline Bruneau

(57) ABSTRACT

There is provided a method for the removal of arsenic from an arsenical bearing sulfides ore, comprising a thermal treatment of arsenical sulfide in the presence of sulfur dioxide, yielding a calcine and a sublimate, the sublimate containing arsenious oxide. The method allows recovering metallic value from an arsenic-bearing metallic sulfides ore, by recovery of the calcine comprising the metallic value of the ore.

11 Claims, 1 Drawing Sheet

(56) References Cited

U.S. PATENT DOCUMENTS

| | | | | |
|---|---|---|---|---|
| 4,185,996 | A | * | 1/1980 | Zambrano ............. C22B 23/005 |
| | | | | 423/154 |
| 4,626,279 | A | * | 12/1986 | Bjornberg ................. C22B 1/10 |
| | | | | 423/22 |
| 8,998,790 | B2 | | 4/2015 | Lalancette et al. |
| 9,051,626 | B2 | | 6/2015 | Lalancette et al. |
| 2014/0107389 | A1 | * | 4/2014 | Lalancette ............. C03C 3/087 |
| | | | | 588/256 |

OTHER PUBLICATIONS

Wang, Guoxin. "Oxidation of Cobaltite." Thesis, University of Nevada-Reno. April. Entire document. (Year: 1993).*
M.G.Aylmore and L.W. Deklerk, "Conditions and Design Considerations for Maximizing Recoverable Gold in Roasting of Refractory Gold Ores",World Gold Conference, Brisbane, QLD, Sep. 26-29, 2013, pp. 1-13.
J. Hammerschmidt, J. Guniner, A. Holmstrom, "Fluidized Bed Technology for Gold Ore and Gold Concentrate", 50th Annual Conference of Metallurgists of CIM: Montreal, Canada, World Gold 2011, pp. 171-182.
International Search Report, PCT/CA2018/050075, dated Apr. 13, 2018.
Dunn, J. G. and Chamberlain, A.C., Mineral Engineering, vol. 10, No. 9, pp. 919-928 (1997).
Lengke, M.F. et al., The oxidtion and dissolution fo arsenic-bearing sulfides, The Canadian Mineralogist, Vo.. 47, pp. 593-613 (2009).
Wang, G.X. et al., Oxidation of cobaltite: Part I. Process mineralogy, Metallurgical and materials transaction B, vol. 26B, 517-521 (1995).

* cited by examiner

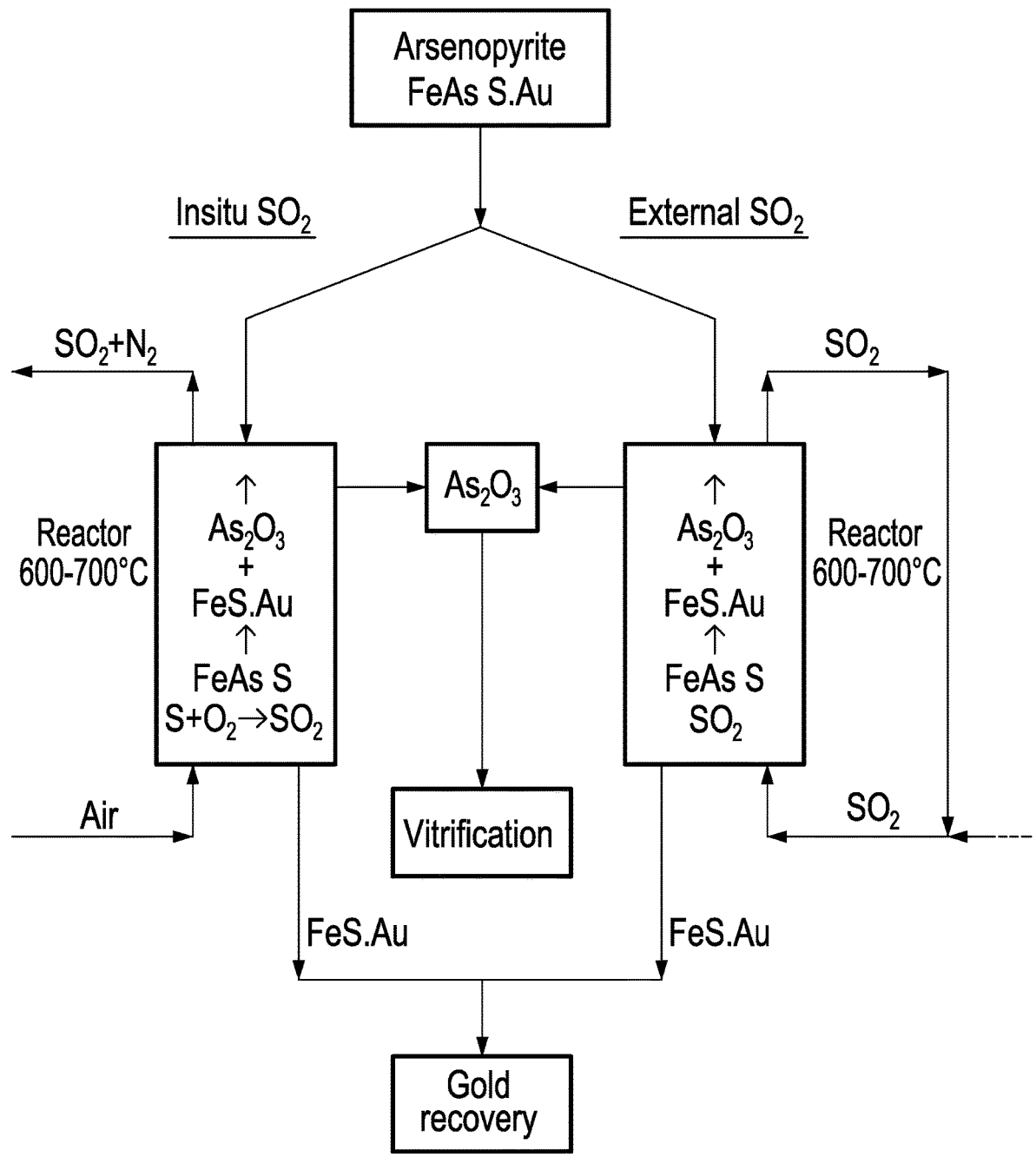

METHOD AND SYSTEM FOR METAL RECOVERY FROM ARSENICAL BEARING SULFIDES ORES

CROSS REFERENCE TO RELATED APPLICATIONS

This application claims benefit of U.S. provisional application Ser. No. 62/478,836, filed on Mar. 30, 2017. All documents above are incorporated herein in their entirety by reference.

FIELD OF THE INVENTION

The present invention relates to metal recovery from arsenical bearing sulfides ores. More specifically, the present invention is concerned with a method and a system for metal recovery from arsenical bearing sulfides ores.

BACKGROUND OF THE INVENTION

It is of frequent occurrence to encounter ores or concentrates heavily tainted with arsenic. Typical examples of such ores are gold bearing arsenopyrite (FeAsS), enargite ($Cu_3AsS_4$), and cobaltite (CoAsS) for example.

Because of environmental considerations, the smelting or other treatments in order to recover the metallic values from such ores or concentrates cannot be implemented.

Several methods have been developed to treat such refractory ores. A roasting method comprises full oxidation of the arsenical ores to oxides of metals along with production of arsenious oxide ($As_2O_3$) and sulfur dioxide ($SO_2$) and separation of the arsenious oxide ($As_2O_3$) from the sulfur dioxide ($SO_2$) which is directed to a sulfuric acid plant has been practiced in the past. Such a method requires cleaning the sulfur dioxide ($SO_2$) stream efficiently and disposing of large amounts of arsenic by methods such as scorodite formation for example. Such a method is now out of practice because of its environmental and economic loads.

Another method comprises the partial oxidation of the arsenical material in order to isolate the arsenious oxide ($As_2O_3$). Still another method comprises non-oxidative volatilization of the arsenic as sulfide. Both methods to be of interest must lead to substrate essentially devoid of arsenic and this arsenic needs to be collected and stabilized in a definitive fashion.

In an attempt to implement these last two methods, it has been noted that the arsenic removal, although significant, was far from complete and that the disposal of arsenious oxide ($As_2O_3$), either by formation of calcium arsenate or scorodite proved not to be a truly definitive disposal of this toxic substance.

There is thus a need in the art for a method and a system for metal recovery from arsenical bearing sulfides.

The present description refers to a number of documents, the content of which is herein incorporated by reference in their entirety.

SUMMARY OF THE INVENTION

More specifically, in accordance with the present invention, there is provided a method for the removal of arsenic from an arsenical bearing sulfides ore, comprising a thermal treatment of arsenical sulfide in the presence of sulfur dioxide, yielding a calcine and a sublimate, the sublimate containing arsenious oxide.

There is further provided a method for recovering metallic value from an arsenic-bearing metallic sulfides ore, comprising a thermal treatment of arsenical sulfide in a sulfur dioxide atmosphere, and recovery of a calcine comprising the metallic value of the ore.

Other objects, advantages and features of the present invention will become more apparent upon reading of the following non-restrictive description of specific embodiments thereof, given by way of example only with reference to the accompanying drawings.

BRIEF DESCRIPTION OF THE DRAWINGS

In the appended drawings:

FIG. 1 is a flowchart of embodiments of an aspect of the present invention.

DESCRIPTION OF ILLUSTRATIVE EMBODIMENTS

In a nustshell, there is provided a method and a system for removal and stabilization of arsenic from arsenical bearing sulfides ores so as to yield a dearsenified product that allows standard metal recovery therefrom.

The method comprises dearsenification based on volatilizing the arsenic as arsenious oxide ($As_2O_3$) while preventing the formation of species that may hinder metal recovery.

Sulfides undergo oxidation in air or in oxygen; partial oxidation, i.e. oxidation with lean air at low temperature, yields arsenious oxide ($As_2O_3$), which has a strong tendency to react with the oxide of the metal in the ores if this oxide is formed by the oxidation of the sulfide of this metal, to yield a stable arsenate, thus preventing a complete removal of the arsenic from the ores. Specifically, arsenopyrite will give $FeAsO_4$; enargite will lead to some $Cu_3(AsO_4)_2$ and cobaltite will be tainted with $Co_3(AsO_4)_2$.

Surprisingly, it was found that in a low oxidative volatilization, i.e. where there is no oxidation of the metal sulfide and in an atmosphere of $SO_2$, the formation of such undesirable arsenates is avoided, i.e. the metals (Fe, Cu, Co) remain as sulfides (FeS, CuS, CoS) and do not combine with the arsenious oxide ($As_2O_3$), as represented by the following relations:

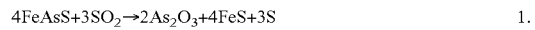

$$4FeAsS + 3SO_2 \rightarrow 2As_2O_3 + 4FeS + 3S \qquad 1.$$

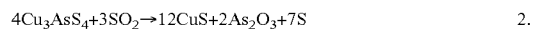

$$4Cu_3AsS_4 + 3SO_2 \rightarrow 12CuS + 2As_2O_3 + 7S \qquad 2.$$

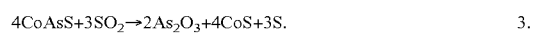

$$4CoAsS + 3SO_2 \rightarrow 2As_2O_3 + 4CoS + 3S. \qquad 3.$$

$SO_2$ may be fed to the system from an external source or may be generated in situ by partial oxidation of the arsenic fraction of the arsenical bearing sulfides ore with lean air.

In complex arsenical substrates, arsenic exists in part at zero valency. Thus, at the temperature of the $SO_2$ treatment, there is a minor evolution of elemental arsenic (As) and arsenic sulfide ($As_2S_2$) as illustrated by relations 4 and 5 for example for arsenopyrite:

$$FeAsS \rightarrow FeS + As \qquad 4.$$

$$2As + 2S \rightarrow As_2S_2. \qquad 5.$$

Considering that $SO_2$ can be generated by very lean air in the system, thus preventing the oxidation of the metal sulfide but allowing the oxidation of the arsenic sulfide, the undesirable reaction of the oxide of the metal with the oxide of arsenic is avoided and the elemental arsenic and the arsenic sulfide are oxidized downstream to arsenious oxide ($As_2O_3$) as per relations 6 and 7:

$$4As + 3O_2 \rightarrow 2As_2O_3 \qquad 6.$$

$$As_2S_2 + 3.5O_2 \rightarrow As_2O_3 + 2SO_2. \qquad 7.$$

In the case of arsenopyrite and enargite, the above volatilization (relations 1 and 2 above) is performed at a temperature in a range between about 600° C. and about 700° C., while for cobaltite the temperature range is between about 900° C. and about 1000° C. The arsenious oxide ($As_2O_3$) condensed in a cool section of the reactor as a result of this heat treatment can be sequestrated as a glass as described in U.S. Pat. No. 8,998,790B2. The heat treatment can be implemented in a rotary kiln or in a fluidized bed.

The above-described heat treatment with $SO_2$, in the range between about 600° C. and about 700° C. for arsenopyrite and enargite for example, or in the range between about 900° C. and about 1000° C. for cobaltite for example, leads to removal of the arsenic from very high values thereof, for example above 15% w/w, for example above 20% w/w, down to trace levels thereof, down to about 0.2% w/w.

The following examples illustrate embodiments of the invention.

In a first experiment with arsenopyrite, according to an embodiment of an aspect of the method as illustrated for example in the right handside of FIG. 1, a 200 g sample of gold bearing arsenopyrite (FeAsS•Au) having the following composition: As: 22.67% w/w; Fe: 20.04% w/w; S: 13.0% w/w; and Au: 26.4 g/t, was heated at 625° C. for two hours in a Vycor® tube with a slow stream of sulfur dioxide $SO_2$ from an external source. It was noted that, as a result (see relation 1 hereinabove), the resulting calcine was essentially depleted of arsenic, at 0.21% w/w As.

In a second experiment with arsenopyrite, according to an embodiment of an aspect of the method as illustrated for example in the left handside of FIG. 1, a 200 g sample of gold bearing arsenopyrite (FeAsS•Au) having the following composition: As: 22.67% w/w; Fe: 20.04% w/w; S: 13.0% w/w; and Au: 26.4 g/t, was heated at 650° C. with a slow addition of air in such a fashion that no oxygen was present at the outlet of the Vycor® tube. In this case, the $SO_2$ is generated in situ (see relations 6 and 7 hereinabove). After such a treatment over a period of 90 minutes, the resulting calcine had an arsenic content of 0.5% w/w.

In an experiment with cobaltite, a concentrate of cobaltite (39% w/w), chalcopyrite (29% w/w) and pyrite (16% w/w) was produced. The chemical analysis of this sample showed the following values: Fe: 16.1% (w/w); Co: 13.9% (w/w); Cu: 10.2% (w/w); Ni: 0.2% (w/w); Pb: 132 ppm; Sb: 510 ppm; As: 17.8% (w/w); $S^{-2}$: 23.4% (w/w).

Controlled oxidation on 20 g of this concentrate was performed in a Lindberg® furnace under a sulfur dioxide atmosphere at a temperature of 900° C. for a period of 1 hour. A calcine of 15.12 g was produced, Chemical analysis of the concentrations of this calcine showed the following values: Fe: 21.4% (w/w); Co: 18.4% (w/w); Cu: 13.5% (w/w); As: 0.2% (w/w); $S^{-2}$: 17.8% (w/w).

In an experiment with enargite, an enargite concentrate (51% (w/w)) was produced. The chemical analysis of this sample showed the following values: Fe: 11.4% (w/w); Cu: 24.8% (w/w); As: 7.1% (w/w); $S^{-2}$: 30.5% (w/w); Au: 1.88 ppm; Ag: 3712 ppm; Ca: 0.3% (w/w); Cd: 293 ppm; Co: 51 ppm; Cr: 432 ppm; Ni: 21 ppm; Pb: 3.8% (w/w); Sb: 3.3%; Te: 172 ppm; Se: 22 ppm; Tl: 492 ppm; Zn: 7.2% (w/w).

Controlled oxidation on 20 g of this concentrate was performed in a LINDBERG furnace under a sulfur dioxide atmosphere at a temperature of 700° C. for a period of 1 hour. A calcine of 16.2 g was produced. Chemical analysis of this calcine showed the following values: Fe: 14.1% (w/w); Cu: 29.5% (w/w); As: 0.3% (w/w); $S^{-2}$: 21.5% (w/w).

In another experiment, a concentrate of cobaltite (39% (w/w)), chalcopyrite (29% (w/w)) and pyrite (16% (w/w)) was produced. The chemical analysis of this sample showed the following values: Fe: 16.1% (w/w); Co: 13.9% (w/w); Cu: 10.2% (w/w); As: 17.8% (w/w); $S^{-2}$: 23.4% (whit). Controlled oxidation was performed in a Lindberg® furnace on 100 g of this concentrate under a sulfur dioxide atmosphere at a temperature of 900° C. for a period of 1 hour.

A calcine of 78 g was produced. A sublimate mass of 10.1 g was also produced. The chemical analysis of this sublimate showed the following values: As: 75% (w/w); Fe: <0.1 ppm; Co: <0.02 ppm; Cu: <0.04 ppm; $S^{-2}$: 0.2% (w/w). 10 g of this sublimate was then incorporated in a mixture with other compounds: recycled glass (20 g); Pure Hematite (5 g). This mixture was put in a crucible and then heated at a temperature of 1200° C. for a period of 1 hour, After a vitrification period, 33.5 g of glass were recovered. The chemical analysis of this glass showed the following values: As: 18.3% (w/w); Si: 18.8% (w/w); Fe: 10.2% (w/w); Ca: 7.7% (w/w); Na; 7.8% (w/w)

The resulting glass was also subjected to leaching tests such as the EPA method 1311 (TCLP) and the EPA method 1312 (SPLP). The values obtained by the tests are: TCLP: 1.42 ppm As; SPLP: 2.48 ppm As.

As people in the art will appreciate, there is thus described a method for removal of arsenic from arsenic-bearing metallic sulfides, comprising a thermal treatment of arsenical sulfide in the presence of sulfur dioxide followed by the condensation of the volatilized arsenious oxide and its sequestration.

The arsenic-bearing metallic sulfides may contain one or several of iron, copper, cobalt, nickel, zinc or lead metals; this arsenical sulfide may be mixed with minor amounts of selenium or tellurium or both; the arsenic may come along with antimony and/or bismuth, the presence of traces of Au, Ag, Pt and Hg at very low level being of occurrence.

The thermal treatment is done at a temperature in a range between about 600° C. and about 700° C. for arsenopyrite or enargite. The thermal treatment is done at a temperature in a range between about 900° C. and about 1000° C. for cobaltite.

The sulfur dioxide required for the reaction may be generated in situ by oxidation of the arsenic fraction of the starting arsenical bearing sulfides ore, as described in relation to the first experiment described hereinabove (see relations 6 and 7 hereinabove; see FIG. 1, left hand side).

The reaction may be conducted in a rotary kiln, or in a fluidized bed reactor.

The resulting arsenious oxide may be sequestrated as a glass.

Thermal treatment in the presence of $SO_2$ was found to volatilize the arsenic as arsenious oxide without secondary reaction of the arsenic with metal, and this arsenious oxide may then be retrieved by sequestration.

The sequestration of arsenic may be done by vitrification.

The scope of the claims should not be limited by the embodiments set forth in the examples, but should be given the broadest interpretation consistent with the description as a whole.

The invention claimed is:

1. A method for the removal of arsenic from an arsenic bearing sulfides ore, consisting of a thermal treatment of the arsenic sulfides of the arsenic bearing sulfides ore in a sulfur dioxide atmosphere in absence of oxidation of metal sulfides, arsenic and the arsenic sulfides being oxidized to $As_2O_3$ as per relations $4As + 3O_2 > 2\, As_2O_3$ and $As_2O_3, +3.5\, O_2 > 2\, As_2O_3 + 2S\, O_2$, yielding a calcine and a sublimate, the sublimate containing $As_2O_3$.

2. The method of claim 1, sequestration of the $As_2O_3$ is after the thermal treatment.

3. The method of claim 1, wherein the arsenic bearing sulfides ore is an arsenic-bearing metallic sulfides ore, and the calcine comprises a metallic value of the ore.

4. The method of claim 1, wherein the arsenic bearing sulfides ore comprises at least one of: iron, copper, cobalt, nickel, zinc and lead metals, and the calcine comprises the at least one of: iron, copper, cobalt, nickel, zinc and lead metals.

5. The method of claim 1, wherein the arsenic-bearing sulfides ore comprises at least one of: iron, copper, cobalt, nickel, zinc and lead metals, said method further comprising recovery of the at least one of: iron, copper, cobalt, nickel, zinc and lead metals.

6. The method of claim 1, wherein the arsenic bearing sulfides ore is arsenopyrite, and said thermal treatment is performed at a temperature in a range between 600° C. and 700° C.

7. The method of claim 1, wherein the arsenic bearing sulfides ore is enargite, and said thermal treatment is performed at a temperature in a range between 600° C. and 700° C.

8. The method of claim 1, wherein the arsenic bearing sulfides ores is cobaltite, and said thermal treatment is performed at a temperature in a range between 900° C. and 1000° C.

9. The method of claim 1, wherein the sulfur dioxide is generated in situ by oxidation of arsenic in the arsenic-bearing sulfides ore.

10. The method of claim 1, wherein the thermal treatment is performed in one of: a rotary kiln and a fluidized bed.

11. The method of claim 1, sequestration of the As7O3 as a glass is after the thermal treatment.

* * * * *